United States Patent [19]
Yoshida et al.

[11] 3,989,892
[45] Nov. 2, 1976

[54] LINE CONCENTRATOR FOR DEALING WITH ASYNCHRONOUS AND SYNCHRONOUS DATA SIGNALS IN A COMMON BIT FORMAT FOR A TIME DIVISION DATA SWITCHING EXCHANGE

[75] Inventors: Shinichiro Yoshida, Tokorozawa; Yoshitsugu Watanabe; Yuji Hayano, both of Tokyo; Susumu Ohara, Yokohama; Takuhito Kojima, Kawasaki, all of Japan

[73] Assignees: Nippon Telegraph and Telephone Public Corporation; Nippon Electric Company, Ltd.; Oki Electric Industry Company, Ltd.; Hitachi, Ltd., all of Tokyo; Fujitsu Ltd., Kawasaki, all of Japan

[22] Filed: July 3, 1975

[21] Appl. No.: 592,958

[30] Foreign Application Priority Data
July 4, 1974   Japan.............................. 49-76757

[52] U.S. Cl............................... 178/50; 179/18 FC
[51] Int. Cl.²......................................... H04L 5/22
[58] Field of Search....... 179/15 BV, 15 BA, 18 FC, 179/15 BY; 178/50

[56] References Cited
UNITED STATES PATENTS

| | | |
|---|---|---|
| 3,238,298 | 3/1966 | Willis.................................. 178/50 |
| 3,492,435 | 1/1970 | Inose............................. 179/18 FC |
| 3,523,278 | 8/1970 | Hinkel................................... 178/50 |
| 3,627,945 | 12/1971 | Diggelmann........................ 178/50 |
| 3,660,606 | 5/1972 | De Witt........................... 179/15 BY |
| 3,761,621 | 9/1973 | Vollmeyer............................. 178/50 |
| 3,894,184 | 7/1975 | Aulhorn............................... 178/50 |

*Primary Examiner*—David L. Stewart
*Attorney, Agent, or Firm*—Sughrue, Rothwell, Mion, Zinn & Macpeak

[57] ABSTRACT

A line concentrator for a time division data switching exchange. Asynchronous and synchronous data signals generated at asynchronous and synchronous data terminals are subjected to known multi-point and synchronous sampling to become a train of bit-multiplexed first asynchronous and synchronous data channel signals. Responsive to a train of bit-interleaved read-in pulse groups timed relative to the respective synchronous data signals, an arithmetic unit stores the data channel signals in an octet memory according to the asynchronous and synchronous data terminals. Responsive to a train of read-out pulses appearing for the respective data terminals, the arithmetic unit reproduces groups of uninterleaved data channel signals for each data terminal and composes the reproduced data channel signals into a train of second asynchronous and synchronous data channel signals given by a common and uninterleaved bit format. The line concentrator is readily modified for decomposition of a train of asynchronous and synchronous data channel signal groups of the bit format into replicas of the original data signals.

3 Claims, 15 Drawing Figures

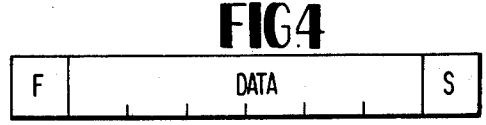
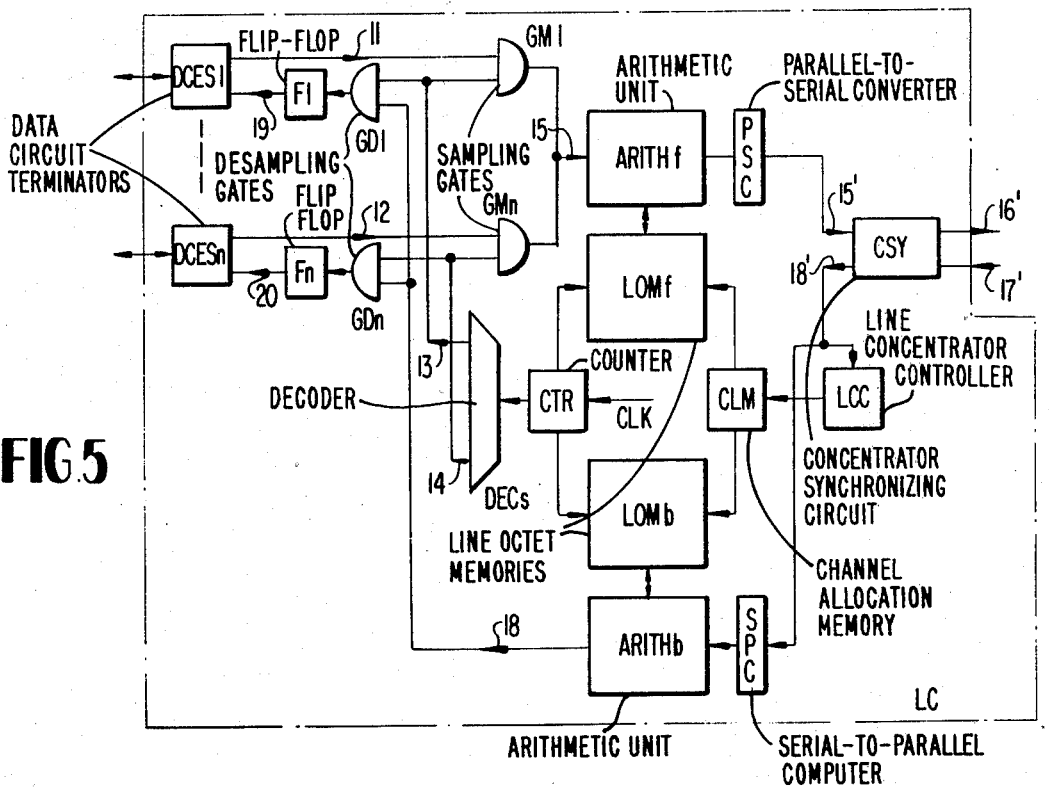
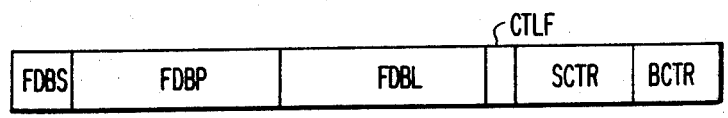
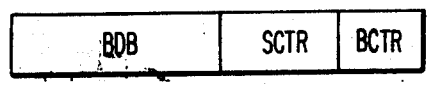

LINE CONCENTRATOR FOR DEALING WITH ASYNCHRONOUS AND SYNCHRONOUS DATA SIGNALS IN A COMMON BIT FORMAT FOR A TIME DIVISION DATA SWITCHING EXCHANGE

BACKGROUND OF THE INVENTION

This invention relates to a line concentrator for use between a highway for a time division data switching exchange and a plurality of asynchronous and synchronous data terminals which send out and receive asynchronous and synchronous data signals. The line concentrator as called herein may also serve as a line distributor as the expression is used elsewhere, for example, in U.S. Pat. No. 3,862,370 issued Jan. 21, 1975, to Shinsuke Kadota, assignor to Nippon Electric Company, Limited, one of the present assignees. The highway may either be an interoffice or an intra-office highway.

It is generally necessary on supplying data and/or speech signals to a time division switching exchange to resort to a multiplexer for sampling the signals sent from a plurality of terminals into a time division multiplexed signal train. On distributing a time division multiplexed signal train from such a switching exchange to terminals, it is necessary to use a demultiplexer which is usually called by the name of multiplexer. For asynchronous and synchronous data signals, the samples have been subjected before transmittal thereof to the highway to bit processing described hereinafter with reference to the accompanying drawing. On the other hand, a PCM switching exchange is preferred in view of its capability of dealing with PCM telephone signals which may be deemed herein as some of the synchronous data signals and in consideration of a future PCM integrated communication system. Also, envelope interleaving is preferred to bit interleaving in view of CCITT Recommendation X.21 while (6 + 2)-bit envelope, with a six-bit character plus F and S bits, has already been standardized as a result of the proposal made in CCITT Recommendation X.50 dated May, 1972. Under the circumstances, envelope interleaving is preferred although bit interleaving may result in shorter frame length and in a simpler channel structure.

SUMMARY OF THE INVENTION

It is therefore a general object of the present invention to provide a line concentrator capable of effecting conversion between a plurality of asynchronous and synchronous data signals and a time division multiplexed signal train wherein data channel signals or samples of the respective data signals are given by bit structures of a common and uninterleaved bit format, such as (6 + 2)-bit envelope.

As described, a line concentrator to which this invention is applicable is for use between a highway for a time division data switching exchange, preferably a time division PCM data switching exchange, and a plurality of asynchronous and synchronous data terminals for asynchronous and synchronous data signals. Each of these data signals comprises a series of bits. The synchronous data signals have a common bit rate or frequency, which fact does not exclude application of this invention to a line concentrator which accommodates other synchronous data terminals dealing with synchronous data signals of other common bit frequencies. In the manner known in the art, the line concentrator comprises first means, such as first sampling gates and/or a combination of first desampling gates and first data signal recovering means, responsive to a first set of timing pulse trains for effecting conversion between the asynchronous data signals and first asynchronous data channel signals of a first time division multiplexed signal train at a plurality of time positions in each bit of the asynchronous data signals. The first means thus carries out multi-point sampling of the asynchronous data signals and/or multi-point desampling of the time division multiplexed signal carrying asynchronous data signals for the asynchronous data terminals. The line concentrator further comprises second means, similar to the first means, responsive to a second set of timing pulse trains having a common repetition frequency of an integral multiple of the bit frequency and timed relative to the first-set timing pulse trains for effecting conversion between the synchronous data signals and first synchronous data channel signals of the first time division multiplexed signal train. The second means carries out synchronous sampling of the synchronous data signals and/or synchronous desampling of the first time division multiplexed signal train for the synchronous data terminals. The integral multiple may be unity. It may be that the first-set timing pulse trains have repetition frequencies different from the common repetition frequency and even from one another. As will readily be understood, the first and second means serve as a multiplexer mentioned above. Between the multiplexer and the highway, the line concentrator comprises third means, which may be a mere connection in a conventional line concentrator of the type described, for effecting interchange of the first time division multiplexed signal train and a second time division multiplexed signal train which comprises second asynchronous and synchronous data channel signals corresponding to the first data channel signals and is placed on the highway.

In accordance with this invention, the third means comprises bit structure memory means for the respective asynchronous and synchronous data terminals and arithmetic unit means for storing in the memory means the asynchronous and synchronous data channel signals of one of the first and second time division multiplexed signal trains, for reproducing signals for use as the asynchronous and synchronous data channel signals of the other time division multiplexed signal train, and for carrying out conversion between the reproduced signals and the data channel signals of the above-mentioned other time division multiplexed signal train, whereby the second asynchronous and synchronous data channel signals are given by bit structures having a common and interleaved bit format, such as the (6 + 2)-bit envelope.

By virtue of giving the second asynchronous and synchronous data channel signals by such bit structures wherein the processing are used alike, it turns possible on further multiplexing and/or carrying out switching in the switching exchange to deal with the data channel signals irrespective of the nature of the data terminals. Among others, (6 + 2)-bit envelope interleaving is excellently compatible with eight-bit PCM-coded voice message. In short, the third means deals with in accordance with this invention the first and/or second time division multiplexed signal train in compliance with octet or similar processing instead of the conventional bit processing.

BRIEF DESCRIPTION OF THE DRAWING

FIG. 4 illustrates an octet as an example of bit structures resorted to in accordance with the instant invention;

FIG. 5 shows, partly in blocks, a line concentrator according to an embodiment of this invention;

FIGS. 8 (A), (B), and (C) show examples of memory areas used in the line concentrator shown in FIG. 5 on forming an octet for an asynchronous and a synchronous data signal and on decomposing an octet for both data signals.

DESCRIPTION OF THE PREFERRED EMBODIMENTS

Figure 1:
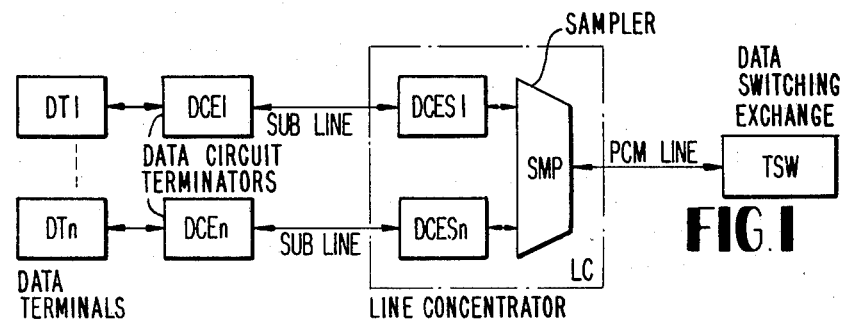
FIG. 1 is a block diagram of a portion of a time division PCM data switching network for bit processing as well as for octet or the like processing.

Referring to FIG. 1, a line concentrator LC for a time division PCM data switching network is connected to asynchronous and synchronous data terminals DT*l*, . . ., and DT*n* through subscriber lines SUB LINE and data circuit terminating equipments or terminators DCE*l*, . . ., and DCE*n* of the terminal side and to a time division PCM data switching exchange TSW through a multiplex PCM line or PCM highway PCM LINE. The line concentrator LC comprises in general a plurality of data circuit terminators DCES*l*, . . ., and DCES*n* of the office side for carrying out level conversion of data signals sent from the respective data terminals DT (suffixes 1, . . ., and *n* being omitted hereafter where intelligible) through the associated data circuit terminators DCE and subscriber lines SUB LINE, and a sampler SMP for delivering a PCM multiplexed data signal train to the switching exchange TSW through the highway PCM LINE. The line concentrator LC is capable of distributing a PCM multiplexed data signal train sent thereto from the switching exchange TSW to the data terminals DT. The data signals for the synchronous data terminals may be presumed to have a common bit frequency without loss of generality as described in the preamble of the instant specification. These synchronous data signals may be dealt with in accordance with the known envelope signalling scheme.

Figure 2:
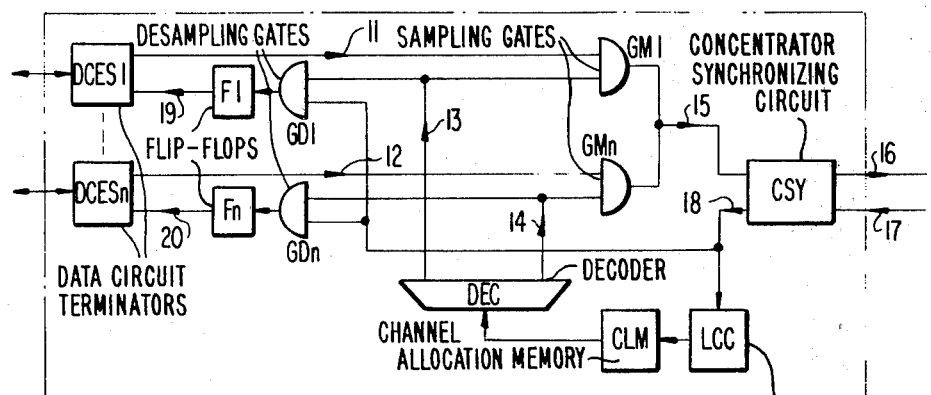
FIG. 2 shows, partly in blocks, a conventional line concentrator used in the network illustrated in FIG. 1.
Figure 3:
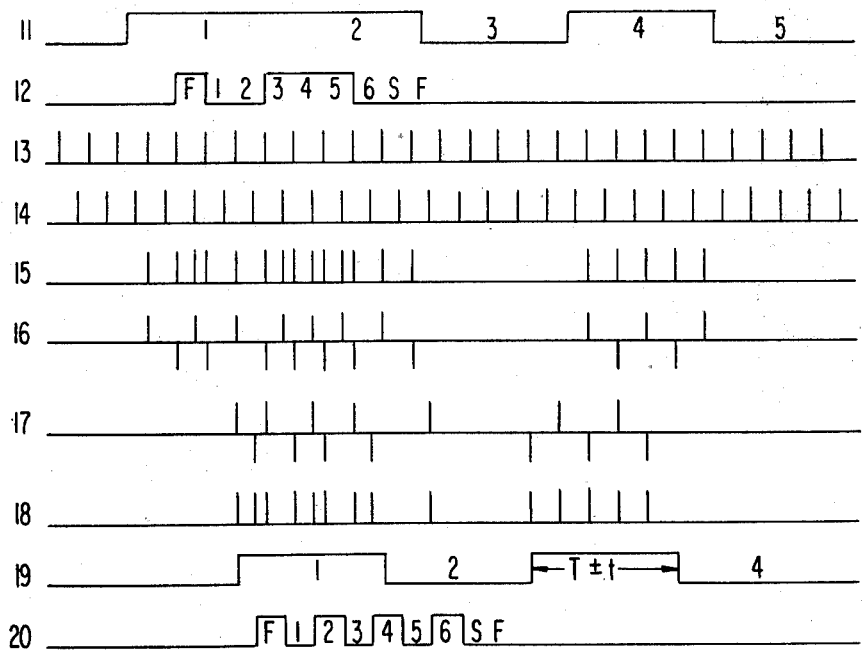
FIG. 3 shows signals at several points in the line concentrator depicted in FIG. 2.

Referring to FIGS. 2 and 3, a conventional line concentrator LC comprises the data circuit terminators DCES mentioned above. It is surmised here for convenience of further description that the first data terminal DT*l* is asynchronous while the *n*-th data terminal DT*n* in synchronous. The first data circuit terminator DCES*l* produces a unipolar asynchronous data signal 11 while the *n*-th data circuit terminator DCES*n*, a unipolar synchronous data signal 12. The data signals, 11, 12, and so on are sampled by staggered or cyclically appearing sampling or timing pulse trains 13, 14, and so on at sampling means exemplified by sampling gates GM*l*, . . ., and GM*n* to be supplied as a bit-multiplexed or bit-interleaved signal train 15 to a concentrator synchronizing circuit CSY for delivering a multiplex bipolar PCM signal train 16 to the highway PCM LINE. More particularly, the data signals 11 and 12 may carry data at 200 bps (bits per second) and 3.2 kbps as shown by bit numbers 1, 2, 3, . . . in FIG. 3 (each asynchronous bit being depicted very short). In addition, the synchronous data signal 12 or the like has bits F for the synchronization signal and bits S for the busy, idle, and other statuses of the relevant data terminals, such as DT*n*. The timing pulse trains 13, 14, . . . may be derived from a decoder DEC for the signals produced by a channel allocation memory CLM and may have, in the example being illustrated, a common repetition frequency of 3.2 kHz. Thus, bit processing is carried out for the asynchronous data signals in accordance with the so-called multi-point sampling and for the synchronous data signals in compliance with the so-called synchronous sampling. Under the circumstances, each bit of the asynchronous data signals is sampled at $3.2 \times 10^3/200 = 16$ /bit.

Further referring to FIGS. 2 and 3, the line concentrator LC serves also to distribute a multiplex bipolar PCM signal train 17 to pertinent ones of the data terminals DT. The line concentrator LC now comprises desampling means exemplified by desampling gates GD*l*, . . ., and GD*n* connected to the respective data circuit terminators DCES through data signal recovering means exemplified by flip-flops F*l*, . . ., and F*n*. The desampling gates GD desample a unipolar bit-multiplexed signal train 18 with reference to desampling or timing pulse trains 13, 14, and so on for which the bit-multiplexed signal train 18 now controls the channel allocation memory CLM through a line concentrator controller LCC. The flip-flops F (different from the reference letter F designating the status bits as will readily be understood) recover an asynchronous data signal 19, a synchronous data signal 20, and so on by subjecting the data pulse outputs of the desampling gates GD to NRZ (non-return to zero) processing. It should be pointed out here that the repetition frequency of the timing pulse train 14 and the like for the synchronous data signals 12, 20, and the like, namely, the second-set timing pulse trains as called in the preamble, should preferably be an integral multiple, including unity, of their bit frequency for convenience of the synchronous sampling and desampling and that that of the timing pulse train 13 and the like for the asynchronous data signals 11, 19, and others, namely, the first-set timing pulse trains as named in the preamble, may not necessarily be equal to one another or to the repetition frequency of the second-set timing pulse trains but should be in timed relation to the second-set timing pulse trains so as to enable time division multiplexing and should be sufficiently high so that the distortion inevitably introduced as indicated at "T ± *t*" into the recovered data signal 19, for example, may not be serious.

Referring now to FIG. 4, asynchronous and synchronous data signals are subjected to octet processing on multiplexing in accordance with a preferred embodiment of the present invention instead of the mere bit processing described in the two next preceding paragraphs. More particularly, the preferred bit format common to all asynchronous and synchronous data signals is a (6 + 2)-bit format which comprises a synchronization bit F, a data block DATA consisting of six bits, and a status bit S. It is to be noted here that the results of sampling are separated into individual data blocks DATA as will become clear as the description proceeds. Referring momentarily back to FIG. 3, it would have been noticed that each of the synchronous data signals 12 and 20 comprises a frame consisting of an F bit, six data bits 1 through 6, and an S bit having a like (6 + 2)-bit format. The synchronization bit F shown in FIG. 4 is for octet synchronization and for improvement in the transmission performance. The status bit S depicted in FIG. 4 may correspond to the S bit depicted in FIG. 3. These synchronization and status bits F and S will also become clear later.

Figure 6:
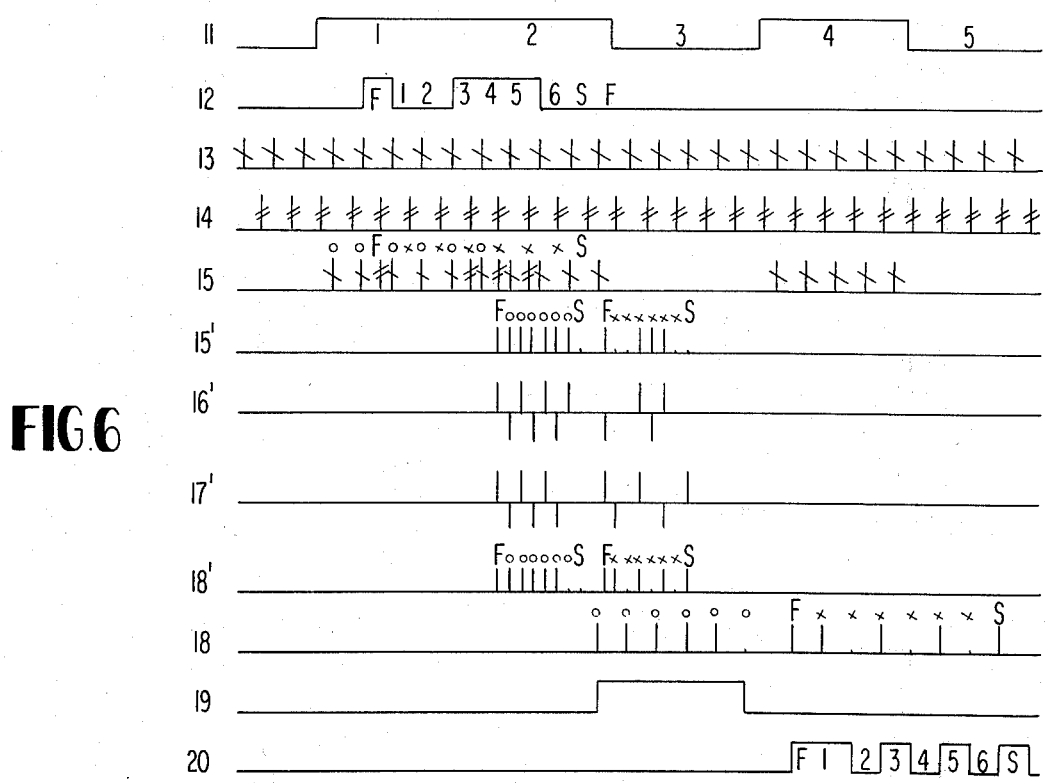
FIG. 6 shows signals at several points in the line concentrator illustrated in FIG. 5.
Figure 7A:
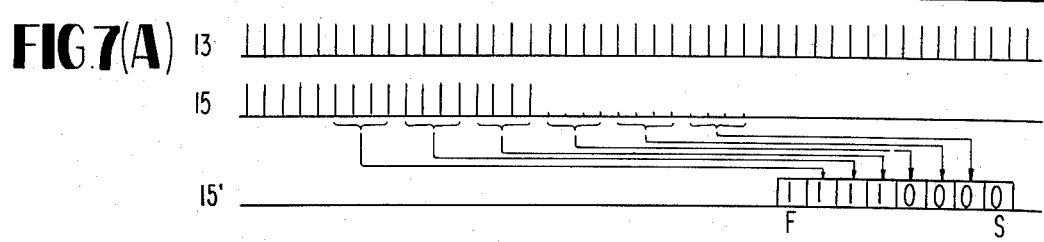
FIGS. 7 (A) and (B) show on an enlarged time scale some of the signals depicted in FIG. 6 for an asynchronous and a synchronous data signal, respectively.
Figure 7B:
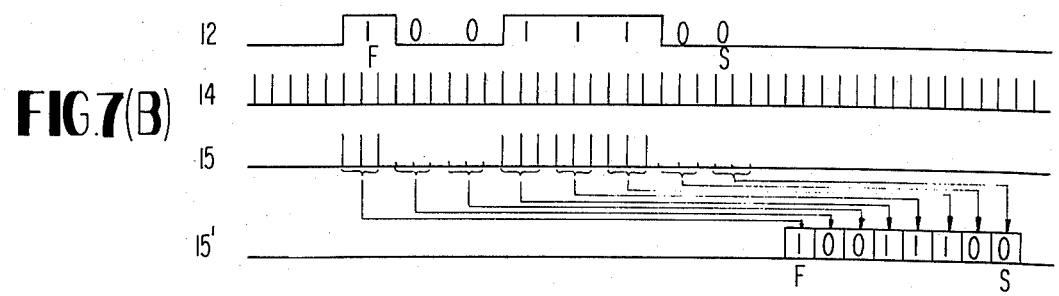
Figure 9A:
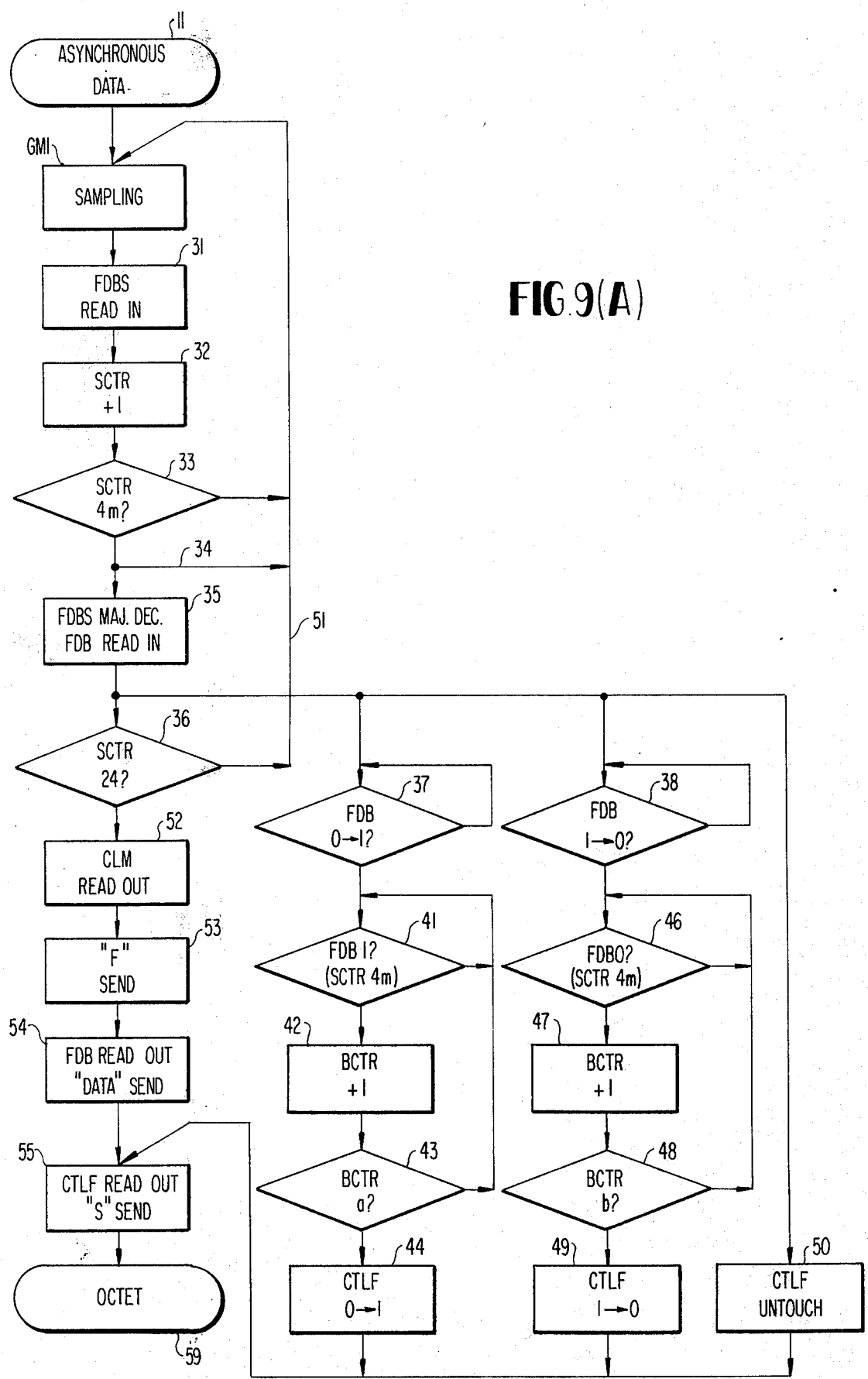
FIGS. 9 (A), (B), (C), and (D) are flow charts for describing the operation of an arithmetic unit used in the line concentrator illustrated in FIG. 5 with respect to composition of an octet for asychronous and synchronous data signals and to decomposition of an octet for asynchronous and synchronous data signals.
Figure 9B:
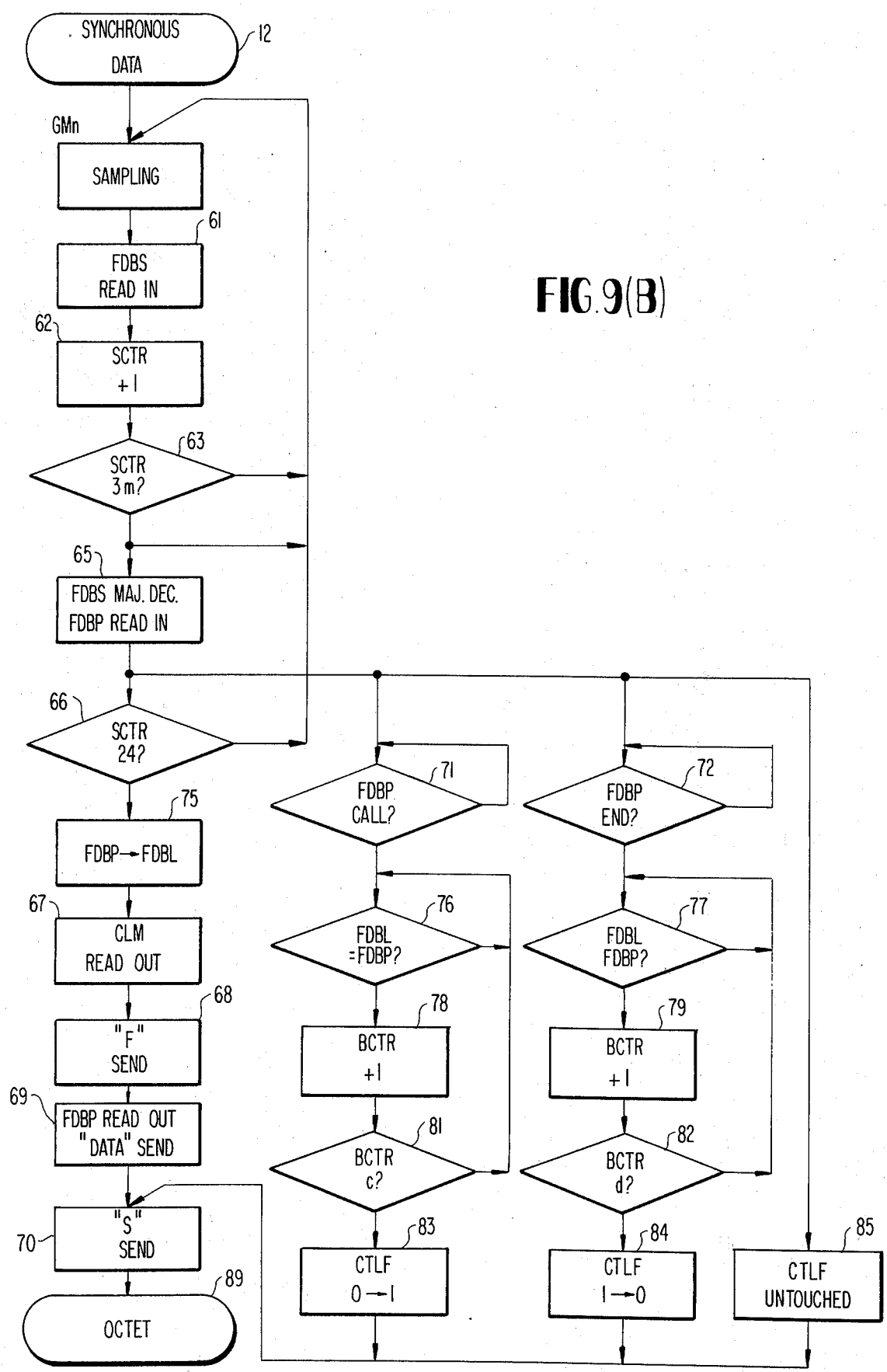
Figure 9C:
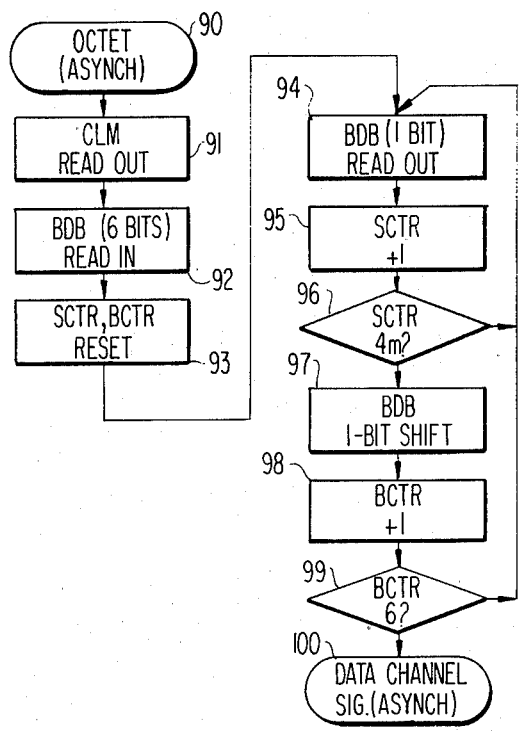
Figure 9D:
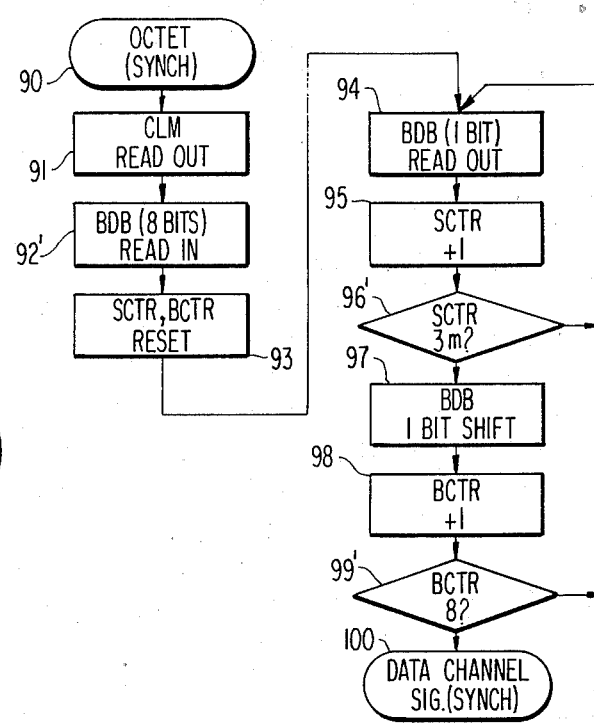

Referring to FIGS. 5 through 7 (A) and (B), a line concentrator LC for carrying out the (6 + 2)-bit envelope interleaving in accordance with a preferred embodiment of this invention comprises the data circuit terminators DCES, sampling means GM, concentrator synchronizing circuit CSY, line concentrator controller LCC, desampling means GD, and data signal recovering means F, all described with reference to FIG. 2. The signals 11 through 15 are similar to those illustrated in conjunction with FIG. 3. In addition to the elements already described, the preferred embodiment comprises bit structure memory means comprising, in turn, a first line octet memory LOMf (the suffixed reference letter $f$ being representative of "forward") having memory locations assigned to the respective asynchronous and synchronous data terminals DT and arithmetic unit means comprising, in turn, read-in and read-out signal producing means described in the following, a first arithmetic unit ARITHf connected to the sampling means GM and coupled to the octet memory LOMf and the read-in and read-out signal producing means for carrying out arithmetic operations on the bit-multiplexed signal train 15 so as to compose the (6 + 2)-bit structures, and a parallel-to-series converter PSC interposed between the arithmetic unit ARITHf and the concentrator synchronizing circuit CSY. The timing pulse trains 13, 14, and others are now produced by decoding at a decoder DECs counter output signals representative of counts in a counter CTR of clock pulses CLM. The counter CTR is an $n$'ary counter, namely, is reset each time the counts reach the number $n$ of the data terminals DT. For the above-mentioned numerical example of the bit rates, the repetition frequency of the timing pulse trains 13, 14, and so on may be 9.6 kHz as shown in FIGS. 7 (A) and (B) although only one timing pulse is depicted in FIG. 6, and may actually be used, for each bit of the synchronous data signal 12 and the like. Each bit of the asynchronous data signal 11 and the like is now sampled at $9.6 \times 10^3/200 = 48$ /bit. Each bit of the synchronous data signal 12 and the like is sampled at $9.6 \times 10^3/(3.2 \times 10^3) = 3$ /bit.

Further referring to FIGS. 5 through 7 (A) and (B) and additionally to FIGS. 8 (A) and (B), the bit format for successively storing the data channel signals or samples in those memory locations of the first octet memory LOMf which are assigned to the respective asynchronous data terminal DTl and others is composed of a data buffer sample area FDBS, a data buffer area FDB, a control bit CTLF, a sample counter area SCTR, and a bit counter area BCTR. The bit format for each synchronous data terminal, such as DTn or the like, consists of a data buffer sample area FDBS, a pair of data buffer areas FDBP and FDBL for the present six first asynchronous data channel signals and the last or next previous six such signals, a control bit CTLF, a sample counter area SCTR, and a bit counter area BCTR. A double data buffer (FDBP and FDBL) is used here in order to keep the envelope phase of the octet-interleaved signal train in a matched state in accordance with the alternative described below. It will be seen from FIG. 6 that the bit-multiplexed signal train 15, namely, the first time division multiplexed signal train as termed in the preamble, comprises first asynchronous and synchronous data channel signals as called also in the preamble. The arithmetic unit ARITHf stores a series of these data channel signals successively in the memory locations of the illustrated bit format in accordance with the respective data terminals DT. For this purpose, the counter CTR produce a train of read-in signal groups in synchronism with the respective timing pulse trains 13, 14, and others. When each of the data terminals DT is specified after storage of a necessary number of the data channel signals in the memory location for the specified data terminal, such as DTl, DTn, or the like, the arithmetic unit ARITHf simultaneously reproduces the stored data channel signals from the last-mentioned memory location. The channel allocation memory CLM therefore produces read-out signals for specifying the respective data terminals DT cyclically or otherwise so that the switching exchange TSW may timely operate. The arithmetic unit ARITHf now successively forms or composes the reproduced data channel signals for each of the data terminals DT into discrete groups of parallel bits of the format illustrated with reference to FIG. 4. The parallel-to-series converter PSC converts a series of octet-interleaved groups for the respective data terminals DT into an octet-interleaved data channel signals train 15', responsive to which the concentrator synchronizing circuit CSY supplies the highway PCM LINE with a bipolar octet-interleaved signal train 16' termed in the preamble as the second time division multiplexed signal train. The second asynchronous and synchronous data channel signals, as called in the preamble, of the latter signal train 16' are of bit structures having the common bit format described with reference to FIG. 4.

Referring afresh to FIG. 8 (C) instead of FIGS. 8 (A) and (B), the concentrator synchronizing circuit CSY converts a bipolar second time division multiplexed signal train 17' received through the PCM highway PCM LINE with reference to the pulses of the synchronization bits F of the respective octets to a unipolar octet-interleaved train 18' of second asynchronous and synchronous data channel signals on distributing the signal train 17' or 18' to the data terminals DT. The bit structure memory comprises a second line octet memory LOMb (the suffixed reference letter $b$ being indicative of "backward") having memory locations assigned to the respective asynchronous and synchronous data terminals DT. The channel allocation memory CLM produces read-in signals indicative of the respective data terminals DT under the control of the line concentrator controller LCC. The counter CTR produces read-out signals. In addition to the read-in and read-out signal producing means, the arithmetic unit means comprises a series-to-parallel converter SPC for converting the second data channel signals interposed between each pair of pulses of the synchronization and status bits F and S into a parallel-bit group and a second arithmetic unit ARITH*b* interposed between the converter SPC and the desampling means GD and coupled to the second octet memory LOM*b* and the read-in and read-out signal producing means. Each memory location has a bit format consisting of a data buffer area BDB, a sample counter area SCTR, and a bit counter area BCTR. The second arithmetic unit ARITH*b* stores the data channel signals in the memory locations specified by the respective read-in signals and reproduces bit by bit the first asynchronous and synchronous data channel signals of the first time division multiplexed signal train 18 as called in the preamble from the memory locations specified by the read-out signals. The latter signal train 18 is subjected to desampling and data signal recovering to become asynchronous and synchronous data signals, such as 19 and 20. The timing pulse trains 13, 14, and others are produced in synchronism with the read-out signals.

Referring more particularly to FIGS. 8 (A) and additionally to FIG. 9 (A), composition of successive bit structures of the octet bit format illustrated with reference to FIG. 4 will be described, by way of example, for an asynchronous data signal 11. Responsive to the read-in signals produced by the counter CTR for the first data terminal DT*l* in synchronism with the timing pulse train 13 marked in FIG. 6 with single short transverse lines, the first arithmetic unit ARITH*f* successively reads at 31 (FIG. 9 (A)) into the data buffer sample area FDBS for the first data terminal DT*l* the binary data channel signals 11 produced for the first time division multiplexed signal train 15 by the sampling gate GM*l* $\zeta$in response to the timing pulse train 13. As each data channel signal is read into the data buffer sample area FDBS, the arithmetic unit ARITH*f* adds at 32 one to a count in the sample counter area SCTR and checks at 33 the count. While repeating the read-in, addition, and check cycle as indicated at 34, the arithmetic unit ARITH*f* derives a binary pulse at 35 by majority decision for the first three bits of the data buffer sample area FDBS each time the count given by two least significant-digit bits of the sample counter area SCTR reaches four as indicated by 4*m* at 33 and illustrated in FIG. 7 (A) between the asynchronous data signals shown at 15 and each bit of the octet depicted at 15'. The arithmetic unit ARITH*f* successively reads the binary pulses into the data buffer area FDB as shown also at 35, again checks at 36 the count in the sample counter area SCTR, and repeatedly checks at 37 and 38 whether or not the presently produced binary pulse is different from the binary pulses already stored in the data buffer area FDB. In this connection, it should be noted here that when the first data terminal DT*l* initiates a call, logic "1" pulses (corresponding to the Z polarity on the associated subscriber's line) are read into the data buffer area FDB and that logic "0" pulses (corresponding to the A polarity on the subscriber's line) are read into the data buffer area FDB upon termination of the data transmission. Furthermore, it is general that a "hit timing" is resorted to for each of initiation of a call and termination of the data transmission.

Referring more in detail to the respective branches shown in FIG. 9 (A), let it be surmised at first that the arithmetic unit ARITH*f* has found at 37 that the data buffer area FDB stores a succession of logic 0 pulses followed by the presently produced logic 1 pulse. While reading successively produced binary pulses into the data buffer area FDB, the arithmetic unit ARITH*f* repeatedly checks at 41 whether or not the binary pulses stored in the data buffer area FDB are all logic 1 each time the count given by two least significant-digit bits of the sample counter area SCTR reaches four. If affirmative, the arithmetic unit ARITH*f* adds at 42 one to a count in the bit counter area BCTR and checks at 43 whether or not the count is equal to an integer *a* preselected in consideration of the hit timing for call initiation. If yes, the arithmetic unit ARITH*f* changes the control bit CTLF from logic 0 to logic 1 at 44. When the arithmetic unit ARITH*f* finds at 38 that the data buffer area FDB stores a succession of logic 1 pulses followed by the presently read-in logic 0 pulse, the ARITHMETIC unit ARITH*f* again and again checks at 46 whether or not the binary pulses stored in the data buffer area FDB have become all logic 0 each time the count given by two least significant-digit bits of the sample counter area SCTR reaches four. If yes, the arithmetic unit ARITH*f* adds at 47 one to the count in the bit counter area BCTR and checks at 48 whether or not the count is equal to another integer *b* predetermined in consideration of the hit timing for data transmission termination. If again yes, the arithmetic unit ARITH*f* changes the control bit CTLF from logic 1 to logic 0 at 49. Otherwise, the arithmetic unit ARITH*f* leaves the control bit CTLF untouched as shown at 50. In the meantime, the arithmetic unit ARITH*f* repeats as designated at 51 the FDBS read-in, SCTR addition, first SCTR check, majority decision and FDB read-in, and second SCTR check cycle and proceeds to the next following step each time the count in the sample counter area SCTR reaches 24 upon the second check shown at 36 of the sample counter area SCTR. The arithmetic unit ARITH*f* now reads at 52 out of the channel allocation memory CLM the read-out signal for the first data terminal DT*l* to find correct timing for transmittal of the second asynchronous data channel signals towards the switching exchange TSW, produces at 53 with reference to a predetermined bit pattern preliminarily given to the arithmetic unit ARITH*f* a synchronization bit F shown in FIG. 4, reads out at 54 six successive binary pulses stored in the data buffer area FDB, such as those marked with small circles in FIG. 6 at the first time division multiplexed signal train 15, to give the six-bit character of each octet as shown again with small circles at the second time division multiplexed signal train 15', and reads out at 55 as the status bit S the logic 1 or 0 pulse stored in the control bit CTLF to eventually compose each of the discrete groups or bit structures of the asynchronous data channel signals in the octet format as indicated at 59. It will now be appreciated that the octets 59 thus composed may not necessarily in the bit-parallel form and that each octet bit may be formed of other-than-four first asynchronous data channel signal or signals.

Referring more specifically to FIG. 8 (B) and afresh to FIG. 9 (B), composition of successive octets will be described, by way of example, for a synchronous data signal 12. Responsive to the read-in signals produced for the *n*-th data terminal DT*n* by the counter CTR in synchronism with the timing pulse train 14 marked in FIG. 6 with double short transverse lines, the first arithmetic unit ARITH*f* successively reads at 61 into the data buffer sample area FDBS for the *n*-th data terminal DT*n* the binary data channel signals 12 produced for the first time division multiplexed signal train 15 by the sampling gate GM*n*. As described in conjunction with the asynchronous data channel signals 11, the arithmetic unit ARITHf adds at 62 one to a count in the sample counter area SCTR, checks at 63 the count, and produces a binary pulse at 65 as a result of majority decision for the first three bits of the data buffer sample area FDBS each time the count given by two least significant-digit bits of the sample counter area SCTR reaches three as indicated also at 63 by 3m. The count of three is used here because each octet bit is formed of three synchronous data channel signals as depicted in FIG. 7 (B) between the signals 15 and 15'. The arithmetic unit ARITHf reads the binary pulses successively into the present data buffer area FDBP as indicated also at 65 and again checks at 66 the count in the sample counter area SCTR. Each time the count reaches 24 as shown also at 66, the arithmetic unit ARITHf may read at 67 a read-out signal for the n-th data terminal DTn out of the channel allocation memory CLM, produce at 68 the synchronization bit F of the octet with reference to the predetermined bit pattern mentioned in connection with octet processing of the asynchronous data channel signals 11, read at 69 the binary pulses stored in the present data buffer area FDBP, such as those marked with small crosses in FIG. 6 at the first time division multiplexed signal train 15, for formation of the pulses also marked with small crosses at the second time division multiplexed signal train 15' of the data block DATA of each octet, and reproduce at 70 the status bit S of the octet in compliance with the binary pulse stored in the present data buffer area FDBP at the bit position corresponding to the S bit in the binary data channel signals 12. Under the circumstances, the bit format of the first octet memory LOMf for the synchronous data terminals, such as DTn, may be identical with that for the asynchronous data terminals, such as DTl.

Alternatively, the first arithmetic unit ARITHf may operate in accordance with the flow depicted by branches in FIG. 9 (B) to check at 71 and 72 whether or not the present data buffer area FDBP stores the call initiation state and the data transmission termination state, respectively, each time the count in the sample counter area SCTR reaches 24 upon the second SCTR check indicated at 66. At the same time, the arithmetic unit ARITHf transfers at 75 the content of the present data buffer area FDBP to the last data buffer area FDBL. While successively reading groups of 24 binary pulses in the present data buffer area FDBP and transferring the content thereof to the last data buffer area FDBL, the arithmetic unit ARITHf repeatedly checks at 76 and 77 identity of the content previously transferred to the last data buffer area FDBL with the presently read-in content of the present data buffer area FDBP, adds one at 78 and 79 to a count of the bit counter area BCTR each time the identity is found, checks at 81 and 82 the count in the bit counter area BCTR, and changes at 83 and 84 the logic 0 and 1 pulses hitherto present in the control bit CTLF to logic 1 and 0 pulses when the arithmetic unit ARITHf finds as indicated also at 83 and 84 the count to be equal to integers c and d predetermined in consideration of the hit timing for the call initiation and the data transmittal termination, respectively. Otherwise, the arithmetic unit ARITHf leaves the control bit CTLF unchanged as indicated at 85. Under these circumstances, the arithmetic unit ARITHf reads out at 70 the control bit CTLF to give the status bit S of each octet. In any event, the octets are successively composed as shown at 89.

Referring to FIG. 8 (C) in particular and afresh to FIG. 9 (C), decomposition will be described in conjunction with an octet 90 (FIG. 9 (C)) contained for the first data terminal DTl in the unipolar second time division multiplexed signal train 18' as depicted in FIG. 6 with small circles described above the binary pulses of the data block DATA. The second arithmetic unit ARITHb reads out at 91 a read-in signal produced for the first data terminal DTl by the channel allocation memory CLM in synchronism with appearance of the octet 90 under the control of the line concentrator controller LCC, read at 92 only six binary pulses of the data block DATA into the data buffer area BDB neglecting the synchronization and status bits F and S, and resets at 93 the sample and bit counter areas SCTR and BCTR to zero. Responsive to the read-out signals produced for the first data terminal DTl by the counter CTR, the arithmetic unit ARITHb reads out at 94 the first binary pulse stored in the data buffer area BDB, adds one at 95 to the count in the sample counter area SCTR, checks at 96 the count while repeatedly reading out the first binary pulse, shifts at 97 the BDB read-out to the next following bit position and add one at 98 to the count in the bit counter area BCTR each time the count given by two least significant-digit bits of the sample counter area SCTR reaches four as indicated at 96 by 4m, and checks at 99 the count in the bit counter area BCTR. When the count in the bit counter area BCTR reaches six, the octet 90 is decomposed into the first asynchronous data channel signals shown at 100 and marked in FIG. 6 with small circles above the binary data channel signals of the first time division multiplexed signal train 18.

Referring finally to FIG. 9 (D), decomposition of an octet 90 contained for the n-th data terminal DTn in the second time division multiplexed signal train 18' and marked in FIG. 6 with small crosses is similar to that described with particular reference to FIGS. 8 (C) and 9 (C). The number of binary pulses read into the data buffer area BDB is, however, eight as indicated at 92' because the synchronization and status bits F and S of the octet 90 are used to provide the F and S bits of the first synchronous data signals. The one-bit shift for the data buffer area BDB is carried out as shown at 96' by 3m each time the count given by two least significant-digit bits of the sample counter area SCTR reaches three. Also, the octet decomposition ends when the count in the bit counter area BCTR reaches eight as shown at 99'.

For the numerical example of the bit rates and of the number of first asynchronous data channel signals for each octet bit, the common repetition frequency of the timing pulse trains 13, 14, and others should be equal to an integral multiple of the asynchronous signal bit rate multiplied by the above-mentioned number, namely, of 1.2 kbps. The least common multiple of 1.2 kbps and 3.2 kbps is therefore used above as the common repetition frequency. If different sampling rates are to be used for the asynchronous and synchronous data signals, the sampling frequencies should merely satisfy the two conditions set forth in conjunction with FIG. 3. It will readily be understood that the arithmetic unit means and bit structure memory means may comprise only one arithmetic unit and bit structure memory each. It will now readily be possible for those skilled in the art to make line concentrators in accordance with other embodiments of this invention, such as where (8 + 2)-bit envelope interleaving is resorted to.

What is claimed is:

1. A line concentrator for use between a highway for a time division data switching exchange and a plurality of asynchronous and synchronous data terminals for asynchronous and synchronous data signals, each comprising a series of bits, said synchronous data signals having a common bit frequency, said line concentrator comprising:

first means responsive to a first set of timing pulse trains for effecting conversion between said asynchronous data signals and first asynchronous data channel signals of a first time division multiplexed signal train at a plurality of time positions in each bit of said asynchronous data signals, second means responsive to a second set of timing pulse trains having a common repetition frequency of an integral multiple of said bit frequency and timed relative to said first set of timing pulse trains for effecting conversion between said synchronous data signals and first synchronous data channel signals of said first time division multiplexed signal train, third means for carrying out conversion between said first asynchronous and synchronous data channel signals and second asynchronous and synchronous data channel signals of a second time division multiplexed signal train, and fourth means for transmitting said second time division multiplexed signal train between said third means and said highway, said second asynchronous and synchronous data channel signals having bit structures of a common and uninterleaved bit format of $(x+2)$-bit envelope, where $x$ represents an integer.

2. A line concentrator as claimed in claim 1, further comprising timing pulse producing means for producing said first and second timing pulse trains, and wherein said third means comprises:

read-in signal producing means operatively coupled to said timing pulse producing means for producing read-in signals in synchronism with said first and second timing pulse trains, read-out signal producing means for producing read-out signals indicative of time slots assigned in said second time division multiplexed signal train to the respective asynchronous and synchronous data terminals, memory means having memory locations assigned to the respective asynchronous and synchronous data terminals, each of said memory locations being capable of memorizing a predetermined number of said first asynchronous and synchronous data channel signals, and arithmetic unit means for storing in response to said read-in signals said first asynchronous and synchronous data channel signals in the memory locations assigned to the respective asynchronous and synchronous data terminals, for producing in response to the read-out signals indicative of the time slots for said asynchronous data terminals the first asynchronous data channel signals, $x$ bits in number, from each of the relevant memory locations, for adding data channel signals for 2 bits to the produced $x$-bit first asynchronous data channel signals to thereby form said second asynchronous data channel signals, and for producing in response to the read-out signals for said synchronous data terminals the first synchronous data channel signals, $x+2$ bits in number, from each of the relevant memory locations to thereby form said second synchronous data channel signals.

3. A line concentrator as claimed in claim 1, further comprising timing pulse producing means for producing said first and second timing pulse trains, and wherein said third means comprises:

means responsive to said second time division multiplexed signal train for producing timing signals indicative of time slots assigned in said second time division multiplexed signal train to the respective asynchronous and synchronous data terminals, read-out signal producing means operatively coupled to said timing pulse producing means for producing read-out signals in synchronism said first and second timing pulse trains, memory means having memory locations assigned to the respective asynchronous and synchronous data terminals, each of said memory locations being capable of memorizing a predetermined number of said second asynchronous and synchronous data channel signals, and arithmetic unit means for storing in response to said timing signals the second asynchronous data channel signals, $x$ bits in number among the $x+2$ bits, in one of said memory locations assigned to the $x$-bit second asynchronous data channel signals, for storing in response to said timing signals the second synchronous data channel signals, $x+2$ bits in number, in one of said memory locations assigned to the $(x+2)$-bit second synchronous data channel signals, and for producing in response to said read-out signals the second asynchronous and synchronous data channels from said memory locations as said first asynchronous and synchronous data channel signals.

* * * * *